United States Patent Office 3,518,188
Patented June 30, 1970

3,518,188
SILICONE COMPOUNDS AND GREASES
Ewald Pirson and Siegfried Nitzsche, Burghausen,
Upper Bavaria, Germany, assignors to Wacker-
Chemie G.m.b.H., Munich, Bavaria, Germany
No Drawing. Filed Sept. 5, 1967, Ser. No. 665,241
Claims priority, application Germany, Sept. 15, 1966,
W 42,413
Int. Cl. C10m 7/26, 7/08, 7/02
U.S. Cl. 252—28                5 Claims

ABSTRACT OF THE DISCLOSURE

Compounds and greases based on organosiloxane fluids filled with silica or other pulverulent material are stabilized on storage and against the effects of heat by incorporating therein an organosiloxane resin.

---

The present invention introduces paste-like compounds and greases which are essentially mixtures of organosiloxane fluids, fillers and organosiloxane resins.

The use of mixtures of organosiloxane fluids and fillers, particularly silica, as pastes, compounds and greases for a wide variety of purposes is one of the first commercial applications in the silicone field (see, for example, "Silicones and Their Uses," by McGregor, published by McGraw-Hill, 1954, page 29). These compositions are based on diorganosiloxane polymers having triorganosiloxy terminal units and exemplified by the formula $$Me_3SiO[Me_2SiO]_xSiMe_3$$

where Me is a methyl radical and $x$ is an integer, admixed with silica. However, these prior art pastes lose their consistency and become thin fluids when subjected to the effects of shear resulting from beating or kneading, unless the filler content of the paste is very high. The deleterious effect of shear is accentuated after the paste has been stored for an extended period (i.e. several months) or after exposure to heat. Further, the pastes having high filler loadings are opaque and clear greases or pastes are often desired.

The object of this invention is to introduce a novel silicone paste or grease. Silicone pastes and greases exhibiting improved stability on storage and improved clarity or transparency are also an object of this invention. Silicone pastes and greases having improved stability under shear are also sought. Other objects and advantages of this invention are described and detailed in this specification and claims.

THE INVENTION

A composition consisting essentially of 100 parts by weight of an essentially linear, benzene soluble organosiloxane polymer having a viscosity in the range from about 1 cs. to 100,000 cs. at 25° C. and 1–70 parts by weight of a pulverulent filler and containing as an additive 2 to 35 parts by weight of a methylsiloxane resin having a methyl to silicon ratio in the range from 0.99/1 to 1.3/1, the silicon valences not satisfied by the methyl substituents being satisfied by oxygen atoms present as Si—O—Si linkages, and hydroxyl, alkoxyl or both hydroxyl and alkoxyl groups.

The basic fluid employed herein is an essentially linear siloxane polymer which is soluble in ordinary organic solvents such as benzene. These polymers can be defined by the unit formula $$R_nSiO_{\frac{4-n}{2}}$$

wherein R is a monovalent hydrocarbon or halogenohydrocarbon radical and $n$ is 1, 2 or 3 and $n$ has an average value in the polymer in the range from 1.9 to 2.4. The operable fluids preferably have viscosities below 100,000 cs. at 25° C. and most preferably below 1,000 cs. at 25° C. These polymers are very well known in the art and are available commercially (see, for example, "Silicones" by Meals and Lewis, Reinhold Publishing Co., 1959, pages 18 to 34, 90 to 92).

The organic radicals bonded to silicon in the linear silioxane polymers are represented by R in the formula above and include alkyl radicals such as methyl, ethyl, propyl, 2-ethyl-hexyl, octadecyl, and $C_xH_{2x+1}$ where $x$ is an integer preferably 1 to 18; alkenyl radicals such as vinyl, allyl, hexenyl, decenyl and $C_xH_{2x}CH=CH_2$, cycloaliphatic radicals such as cyclohexyl, cycloheptyl, cyclohexenyl and $$\underline{CH_2—C_xH_{2x}—CH_2}$$

aryl and alkaryl radicals such as phenyl, naphthyl, tolyl, xylyl and ethylphenyl radicals; aralkyl radicals such as benzyl and phenylethyl radicals and halogenated derivatives of the foregoing such as chloromethyl, bromoethyl, 3,3,3-trifluoropropyl, perchlorovinyl, bromochloroallyl, iodocyclohexyl, bromophenyl, perchlorophenyl, chlorobenzyl, dichlorophenyl, tetrachlorophenyl and chloronaphthyl radicals.

The linear siloxane polymers consist primarily of chains of $R_2SiO$ units with $R_3SiO_{1/2}$ units as terminal units on each chain but limited proportions (i.e. not exceeding about 10% of the units present) of $RSiO_{3/2}$ and $SiO_{4/2}$ units can be present. The closer the siloxane polymer approaches the ideal linear polymer free of monoorganosiloxane and $SiO_{4/2}$ units, the better the results. The endblocking units can be $R_3SiO_{1/2}$ units as noted above and can also be $(R'O)R_2SiO_{1/2}$ units where R is as above defined and R' is an alkyl radical of 1 to 5 carbon atoms or an aryl radical.

The preferred organosiloxane polymers employed in this invention are defined by the formula $$R_3SiO[R_2SiO]_nSiR_3$$

where $n$ is 8 to 100, at least 50 percent of the R groups being methyl and the remaining R groups, if any, being phenyl radicals, such polymer having a viscosity in the range from 50 to 30,000 cs. at 25° C. and most preferably from 100 to 1,000 cs. at 25° C.

The fillers employed in the greases, compounds and pastes of this invention include a wide variety of finely-divided materials. Particularly useful are the silicas including diatomaceous earth, fume silicas, silica aerogels and xerogels, treated silicas displaying various organosilyl groups on the surface and exhibiting hydrophobicity, and generally those silicas having surface areas of at least 80 m.²/g. In addition to the silicas, the compositions of this invention can contain metal soaps such as lithium octoate, lithium stearate and other heat stable soaps well known as thickening agents for greases, carbon blacks, graphites, phthalocyanine pigments, and similar materials.

The preferred fillers are silicas having surface area of at least 80 m.² per gram. Such silicas can be those produced pyrogenically in the gas phase (i.e. fume silicas), dehydration of silicic acid hydroxides (silica aerogels and xerogels) and precipitated silicas.

The fillers are employed in proportions of from 1 to 70 parts by weight per 100 parts of the linear siloxane polymer and best results are achieved with 4 to 45 parts by weight of filler.

The novel ingredient herein is the methylsiloxane additive. This siloxane polymer has the general unit formula $$(CH_3)_m(R''O)_pSiO_{\frac{4-m-p}{2}}$$

where R″ is a hydrogen atom or alkyl radical of 1 to 5 carbon atoms, $m$ has an average value of 0.99 to 1.3 and $p$ has an average value of 0.03 to 0.20. These polymers are resinous liquids having 0.99 to 1.3 methyl groups per silicon atom, 0.03 to 0.20 hydroxyl or alkoxyl radicals per silicon atom and the remainder of the silicon valences are satisfied by oxygen atoms present as Si—O—Si linkages. These polymers are made up of unsubstituted siloxane, monomethyl siloxane, dimethylsiloxane and trimethylsiloxane units and preferably contain not more than 25% of units having two or three methyl groups per silicon atom and it is preferred to employ liquids having viscosity not exceeding 1,000 cs. at 25° C. as measured in a 50% by weight solution of the siloxane polymer in toluene. These resinous methylsiloxane liquids are known and are produced by well recognized commercial methods.

The resinous methylsiloxane liquids are employed in proportions in the range from 2 to 35 parts by weight per 100 parts of the linear organopolysiloxane oil and preferably in proportions of from 3 to 20 parts on the stated basis.

To prepare the pastes of the present discovery, the organopolysiloxane oils, fillers and the methylpolysiloxanes with 0.99 to 1.3 methyl groups per Si atom can be mixed with each other in any desired order of addition. The mixing can be done in any kind of a mixing apparatus which is common for the preparation of silicone pastes, for instance in a mixing container equipped with a simple stirrer or a planetary stirring apparatus. To insure a good dispersement of the mixing components within each other, i.e. to homogenize them, the paste which has been prepared in a mixing container equipped with a stirring apparatus can be passed over a rolling mill.

The paste of the present discovery based on organopolysiloxane oils and fillers can be used for all purposes for which silicone pastes or silicone greases are ordinarily used. These applications include use as release agents and releasing rubber, plastic and glass parts from a mold, embedding electrical apparatus, vibration damping, sealing materials, protection against moisture as well as lubricating combination bearings such as metal/plastic, metal/rubber, plastic/plastic, as well as glass stop-cock lubricant, ground glass joints, and valves and for other lubricant applications, for instance as a wire drawing lubricant.

In the following examples the consistency is measured by means of a penetrometer according to DIN 51804. The penetration depth of a pin is given in $\frac{1}{10}$ m. Penetrometer values above 350 indicate that the paste is highly fluid to an undesirable degree, i.e. it displays an undesired low viscosity. Measurement by the means of a penetrometer takes place before (quiescent penetration), and after shear stress of the paste by 60 intensive kneadings ("Beating Penetration") and 10,000 intensive kneadings ("Beating Penetration 10,000").

The stability of the consistency at high temperature is tested in the following examples by applying a 2 mm. film of the paste onto a piece of metal to be tested and setting the piece of metal thus coated perpendicularly and heating it for 60 minutes at 200° C. If the paste does not appear to run off this piece of metal, the stability of the consistency is satisfactory.

The surface of the silica given in the following examples was always taken according to so-called BET method (see Brunauer, Emmet and Teller, "Journal of Amer. Chem. Soc.," vol. 60, p. 309).

The following examples are included to assist in understanding and practicing this invention. The examples do not restrict the scope of the invention which is defined in the claims.

Example 1

180 kg. trimethylsiloxy endblocked dimethylpolysiloxane with a viscosity of 230 cs. at 25° C., 11 kg. of a resinous organopolysiloxane copolymer of 95 mol percent monomethylsiloxane units and 5 mol percent dimethylsiloxane units, having an average of 0.08Si bonded hydroxyl groups and 0.12Si bonded ethoxy groups per silicon atom and 29.5 kg. of fume silica with a surface area of 210 m.²/g. were mixed with each other in a planetary mixing apparatus for 30 minutes. The mixture thus obtained was homogenized in the final step on a roll mill (paste A).

For comparison, the above process procedure was repeated with the exception that the 11 kg. of the organopolysiloxane with 95 mol percent monomethylsiloxane units was replaced by an identical quantity of trimethylsiloxane endblocked dimethylpolysiloxane with a viscosity of 230 cs. at 25° C. (paste B).

Tests immediately after the preparation of the paste:

|  | Quiescent penetration | Beating penetration | Consistency stability |
| --- | --- | --- | --- |
| Paste A | 230 | 240 | Will not run off. |
| Paste B | 235 | 260 | Will run off. |

Examination after six weeks storage:

|  | Quiescent penetration | Beating penetration | Consistency stability |
| --- | --- | --- | --- |
| Paste A | 230 | 240 | Will not run off. |
| Paste B | 245 | 380 | Will run off. |

The consistency of paste A remains unchanged while paste B becomes thickly fluid upon homogenizing on the roll mill.

Example 2

22.5 kg. of trimethylsiloxy endblocked dimethylpolysiloxane with a viscosity of 1000 cs. at 25° C., 3.0 kg. of an organopolysiloxane of 90 mol percent monomethyl and 10 mol percent dimethylsiloxane units containing an average of 0.09Si bonded hydroxyl groups and 0.12Si bonded ethoxy groups per silicon atom and 2.0 kg. fume silica with a surface area of 150 m.²/g. are mixed in a planetary stirrer for 30 minutes. The mixture thus obtained is homogenized on a rolling mill.

|  | Directly after preparation of pastes | After 12 weeks storage |
| --- | --- | --- |
| Quiescent penetration | 295 | 295 |
| Beating penetration | 310 | 312 |
| Beating penetration, 10,000 | 335 | 338 |

Example 3

80 kg. of a dimethylpolysiloxane containing 1Si bonded ethoxy group in each terminal unit having a viscosity of 15,000 cs. at 25° C., 18 kg. of an organopolysiloxane of 80 mol percent monomethylsiloxane units and 20 mol percent dimethylsiloxane units containing an average of 0.08Si bonded hydroxyl groups and 0.12Si bonded ethoxy groups per silicon atom and 75 kg. fume silica with a surface area of 300 m.²/g. are mixed with each other in a planetary stirrer for 30 minutes. The mixture thus obtained is then homogenized on a rolling mill (paste C).

Paste D was prepared in the same manner as paste C but with the exception that the 18 kg. of the organopolysiloxane with 80 mol percent monomethylsiloxane units was replaced by the same quantity of dimethylpolysiloxane containing 1Si bonded hydroxyl group in each terminal unit, 15,000 cs. at 25° C.

Directly after the preparation both pastes have a quiescent penetration of 290.

Half of the quantity of both pastes is heated to 180° C. for six hours and is then allowed to run over a rolling mill. Thereafter paste C has a quiescent penetration of 295 and paste D has a quiescent penetration of 380.

The remainder of the two pastes is stored for 10 weeks. A test of the consistency stability shows that paste D will run off of the piece of metal in contrast to paste C which will not run.

Example 4

Equivalent results were achieved when Example 2 was repeated employing trimethylsiloxy endblocked phenylmethylsiloxane, methoxy dimethylsiloxy endblocked 3,3,3-trifluoropropylmethyl siloxane or vinylmethylphenylsiloxy endblocked copolymers of $(CH_3)_2SiO$, $$(CH_3)C_6H_5SiO$$

and $CH_2=CH(C_2H_5)SiO$ units of 1000 cs. vviscosity in place of the trimethylsiloxy endblocked dimethylsiloxane.

That which is claimed is:

1. A composition of grease-like consistency exhibiting improved stability consisting essentially of (a) 100 parts by weight of an essentially linear, benzene soluble organosiloxane polymer having a viscosity in the range from about 1 cs. to 100,000 cs. at 25° C., (b) 1 to 70 parts by weight of a pulverulent silica filler and (c) 2 to 35 parts by weight of a polymeric methylsiloxane resin having a methyl to silicon ratio of from 0.99/1 to 1.3/1, the silicon valences in said resin which are not satisfied by methyl substituents or oxygen atoms present as Si—O—Si linkages being satisfied by hydroxyl, alkoxy or both hydroxyl and alkoxyl radicals.

2. A composition in accordance with claim 1 further defined in that the organosiloxane polymer (a) is a triorganosiloxy endblocked diorganosiloxane wherein 50 to 100 percent of the organic substituent are methyl radicals and 0 to 50 percent are phenyl radicals and (b) is a fume silica.

3. A composition in accordance with claim 2 wherein the polymeric methylsiloxane resin (c) is of the general unit formula $$(CH_3)_mSi(OR'')_pO_{\frac{4-m-p}{2}}$$

where R'' is hydrogen or an alkyl radical of 1 to 5 carbon atoms, $m$ has an average valve of 0.99 to 1.3, $p$ has an average value of 0.03 to 0.20, said polymeric methylsiloxane resin containing not more than 25 mol percent of dimethylsiloxy and trimethylsiloxy units, said resin having a viscosity not exceeding 1,000 cs. when measured at 25° C. in a 50 percent siloxane solution in toluene.

4. A composition in accordance with claim 1 wherein the organosiloxane polymer (a) is of the general formula $R_3SiO(R_2SiO)_nSiR_3$ where at least 50 percent of the R groups are —$CH_3$ radicals and up to 50 percent of the R groups are —$C_6H_5$ radicals, and $n$ has a value from 8 to 100.

5. A composition in accordance with claim 4 wherein the filler (b) is a silica having a surface area of at least 80 sq. meters per gram.

References Cited

UNITED STATES PATENTS

| | | | |
|---|---|---|---|
| 2,491,843 | 12/1949 | Wilcock | 252—49.6 |
| 2,705,700 | 4/1955 | Iler | 252—49.6 |
| 3,145,175 | 8/1964 | Wright | 252—28 |
| 3,269,949 | 8/1966 | Borg | 252—49.6 |
| 3,344,066 | 9/1967 | Schiefer | 252—28 |

DANIEL E. WYMAN, Primary Examiner

I. VAUGHN, Assistant Examiner

U.S. Cl. X.R.

252—49.6